United States Patent [19]

Murata

[11] Patent Number: 4,979,030
[45] Date of Patent: Dec. 18, 1990

[54] COLOR DISPLAY APPARATUS

[75] Inventor: Yasushi Murata, Saitama, Japan

[73] Assignee: Pioneer Electronic Corporation, Tokyo, Japan

[21] Appl. No.: 353,941

[22] Filed: May 19, 1989

[30] Foreign Application Priority Data

Nov. 30, 1988 [JP] Japan ................. 63-303444

[51] Int. Cl.$^5$ ............................. H04N 9/12
[52] U.S. Cl. ......................... 358/56; 358/60; 358/63; 358/59; 358/68
[58] Field of Search ........ 358/56, 60, 63, 58, 358/59, 68, 61, 62, 63, 66

[56] References Cited

U.S. PATENT DOCUMENTS 3,303,273  2/1967  Williams et al. ............ 358/58
3,864,730  2/1975  Roth ....................... 358/63
4,451,852  5/1984  Masuda et al. .............. 358/56

FOREIGN PATENT DOCUMENTS 0169282  9/1984  Japan .

Primary Examiner—Edward L. Coles, Sr.
Assistant Examiner—Jerome Grant, II
Attorney, Agent, or Firm—Finnegan, Henderson, Farabow, Garrett, and Dunner

[57] ABSTRACT

A color display apparatus for displaying a color video format signal comprising a two-dimensional screen on which light-beam sensitive three-primary-color luminous bodies are arrayed regularly in a predetermined direction, a generator for generating horizontal and vertical synchronizing signals from the video format signal, a light-beam deflector for scanning the two-dimensional screen with a signal light beam in synchronism with the horizontal and vertical synchronizing signals, and a modulator for modulating the intensity of the light beam in accordance with the color video format signal in synchronism with the scanning of the light beam in the predetermined direction.

15 Claims, 4 Drawing Sheets

4,979,030

COLOR DISPLAY APPARATUS

BACKGROUND OF THE INVENTION

1. Field of the Invention

The present invention relates to a color display apparatus in which a light beam is intensity-modulated with a so-called color video format signal, that is, a color video signal including a composite synchronizing signal composed of vertical and horizontal signals, etc., and is caused to perform two-dimensional scanning. The scanning occurs on a screen in synchronization with the composite synchronizing signal to reproduce a picture.

2. Description of the Relates Art

Referring to FIG. 7, an example of the conventional color display apparatus will be described.

In FIG. 7, a helium neon laser generator 1 generates red laser light (having a wavelength of 633 nm), an argon ion laser generator 2 generates green laser light (having a wavelength of 515 nm), and a helium cadmium laser generator 3 generates blue laser light (having a wavelength of 441 nm). The laser light of the three primary colors is supplied to light modulators 4, 5 and 6. Light modulators 4, 5 and 6 generate R, G and B signals that each carry color video information as modulating signals.

The intensity of the red laser light is modulated by the light modulator 4 in accordance with the level of the R signal. The direction of light is changed by a reflection mirror 7 so as to enter a reflection mirror 10 through dichroic mirrors 8 and 9. The intensity of the green laser light is modulated by the light modulator 5 in accordance with the level of the G signal. The direction of light is changed by the dichroic mirror 8 so as to enter the reflection mirror 10 through the dichroic mirror 9. Finally, the intensity of the blue laser light is modulated by the light modulator 6 in accordance with the level of the B signal. The direction of the light is changed by the dichroic mirror 9 so as to enter the reflection mirror 10.

A single light beam comprising the three primary colors, mixed by the dichroic mirrors 8 and 9, is emitted from the reflection mirror 10. This single light beam is deflected by a reflection mirror 11 of a galvanometer that is arranged to swing in synchronization with a vertical synchronizing signal of a video signal. The light beam is then passed through a pair of relay lenses 12a and 12b and is further deflected by a rotary polyface mirror 13. Rotary polyface mirror 13 is arranged to rotate in synchronization with a horizontal synchronizing signal of the video signal.

The direction of the light beam deflected by the rotary polyface mirror 13 is changed by a reflection mirror 14 to reflect the beam on a screen 15, and thereby scan the screen. The spot diameter of the light beam is adjusted by a lens of an optical system (not shown).

In the display apparatus described above, the intensity of three color laser beams, red, green, and blue, are modulated by light modulators with color television three-primary-color signals. The three beams are mixed into one light beam by dichroic mirrors, and projected by mechanical light deflectors onto a two-dimensional scanning screen. This arrangement produces a color television display apparatus having high resolution and high chromatic quality. The relay lenses 12a and 12b are used to make the rotary polyface mirror 13 small-sized.

FIG. 8 shows a control system of the color display apparatus, in which a data processor 20 is arranged to separate a video signal from a color video format signal supplied thereto, to demodulate the separated video signal into R, G and B signals. The data processor 20 then supplies the demodulated R, G and B signals to a driver 21 in accordance with a command supplied from a controller 22. The driver 21 amplifies the R, G and B signals and supplies the amplified signals to the light modulators 4, 5 and 6, respectively.

The data processor 20 also separates horizontal and vertical synchronizing signals from the color video format signal and supplies the separated synchronizing signals to the controller 22. The controller 22 is constituted by a micro-processor, PLL circuits for horizontal and vertical deflection, and so on. The vertical deflection PLL circuit is arranged to generate a driving signal in synchronism with the vertical synchronizing signal supplied thereto. The vertical deflection PLL circuit also supplies the driving signal to a galvanometer 23 to cause the galvanometer 23 to swing the mirror 11. Thus, the reflection mirror 11 reciprocates with a vertical period synchronous with the vertical synchronizing signal. The rotational position of the reflection mirror 11 is detected by an encoder 24 interlocked with the galvanometer 23. The detection output of the encoder 24 is fed back to the vertical deflection PLL circuit of the controller 22 and phase-compared with the vertical synchronizing signal. Feedback control is thus performed to establish synchronization between the vertical synchronizing signal and vertical scanning.

The horizontal deflection PLL circuit is arranged to generate a driving signal synchronized with the supplied vertical synchronizing signal and supplies the driving signal to a motor 25 so as to rotate the rotary polyface mirror 13. The rotational position of the rotary polyface mirror 13 is detected by an encoder 26 interlocked with the motor 25. The detection output of the encoder 26 is fed back to the horizontal PLL circuit of the controller 22 and phase-compared with the horizontal synchronizing signal so that feedback control is performed. This feedback control establishes synchronization between the horizontal synchronizing signal and the horizontal scanning. The controller 22 generates a supply command to the data processor 20 in agreement with the start timing of the horizontal scanning of the light beam.

Thus, the scanning on the screen surface by the light beam is deflected two-dimensionally by the mechanical light deflectors, and the intensity and color change of the light beam are synchronized with each other to project a picture on the screen.

However, such a color display apparatus has the disadvantage of being expensive because it requires three light-beam generators for generating three light beams of three primary colors and an optical system for mixing those three primary colors.

SUMMARY OF THE INVENTION

It is therefore an object of the present invention to provide a color display apparatus which can be constructed relatively inexpensively.

In order to achieve the above and other objects, a color display apparatus according to the present invention comprises a two-dimensional screen having light sensitive three-primary-color luminous bodies arrayed regularly in a predetermined direction, a light-beam deflection means for scanning the two-dimensional screen with a signal light beam in synchronism with horizontal and vertical synchronizing signals separated from a color video format signal, and modulation means for modulating the intensity of the light beam in accordance with an information signal in the color video format signal in synchronism with the scanning of the light beam in the predetermined direction.

BRIEF DESCRIPTION OF THE DRAWINGS

Other features and advantages of the present invention will be apparent from the following description taken in connection with the accompanying drawings, wherein.

DETAILED DESCRIPTION OF PREFERRED EMBODIMENT

Figure 7:
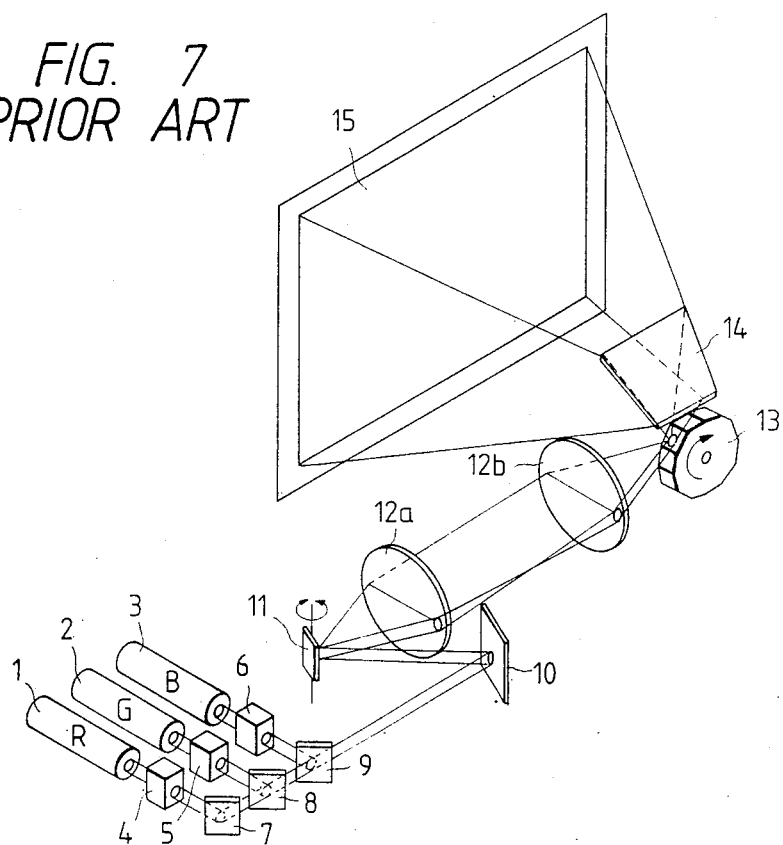
FIG. 7 is a schematic view showing an example of the conventional color display apparatus.

Referring to the drawings, embodiments of the color display apparatus according to the present invention will now be described. In the color display apparatus shown in FIG. 1, parts corresponding to those in the color display apparatus shown in FIG. 7 are correspondingly referenced, and the description of those parts will be omitted.

Figure 1:
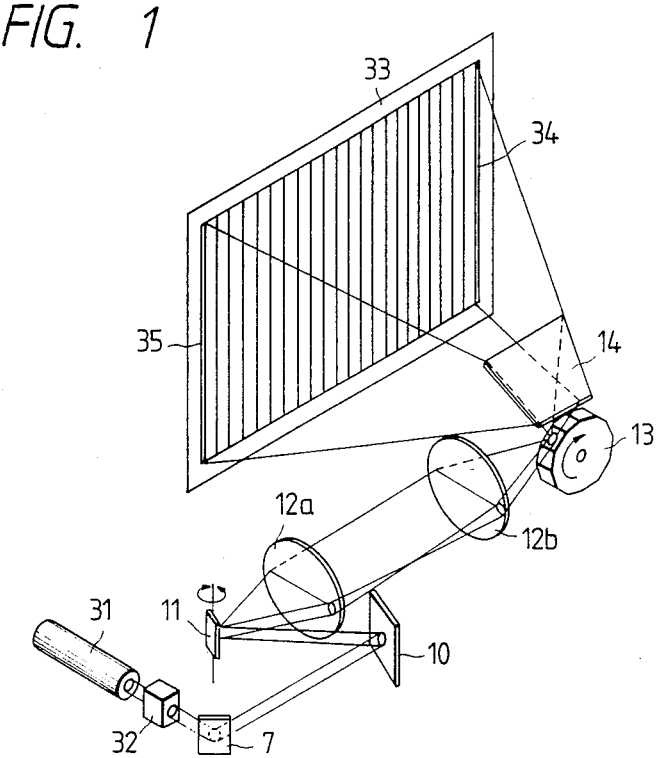
FIG. 1 is a schematic view showing the configuration of an embodiment of the color display apparatus according to the present invention.

In FIG. 1, an argon ion laser generator 31 is arranged to generate ultraviolet laser light (for example, having a wavelength of 364 nm). The laser light passes through a light modulator 32 and is then directed by a reflection mirror 7 to a reflection mirror 10.

Figure 2:
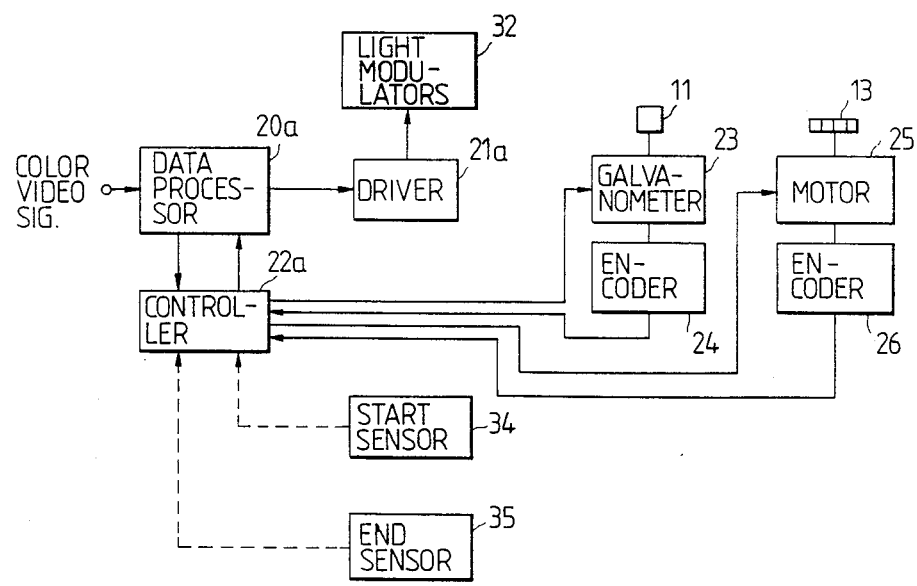
FIG. 2 is a block diagram showing an embodiment of a control system in accordance with the present invention.

A time-division color signal, in which a set of R, G and B signals representing colors of picture elements described below, is applied to the light modulator 32. The R, G and B signals are aligned in series and applied to the light modulator 32 from a driver 21a (FIG. 2). The intensity of the light beam is modulated in accordance with the level of the R, G and B signals and is two-dimensionally deflected through a mechanical deflection system. The mechanical deflection system is constituted by optical elements 11–14 to project an image onto a screen 33.

Figure 3:
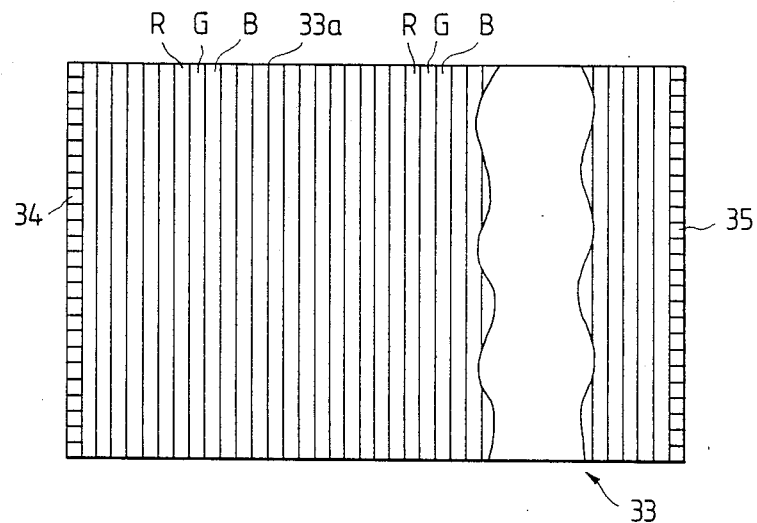
FIG. 3 is a diagram depicting the construction of the screen of FIG. 1.

As shown in FIG. 3, grid-like or dot-like red, green, and blue luminous bodies (shown as R, G and B, respectively) are caused to emit light in response to irradiation by a light beam. They are arranged on the projection surface of the screen in a regular, predetermined direction, for example, in the direction of scanning. For example, every picture element is constituted by one set of R, G and B phosphors, and for example, black shade members 33a are interposed between adjacent picture elements to prevent color bleeding from occurring.

Further, a start sensor 34 and an end sensor 35 are provided on the opposite end portions of the projection surface of the screen 33. In the event that the encoders, such as elements 24 and 26, provide insufficient synchronization control, sensors 34 and 35 are used to make further fine control (horizontal synchronization control). This causes the light beam modulated with the R, G and B signals to accurately irradiate the corresponding R, G and B phosphors on the screen surface. Each of the sensors 34 and 35 is constituted by, for example, a photoelectric conversion element.

The operation of the apparatus will now be described with reference to FIG. 2.

Figure 8:
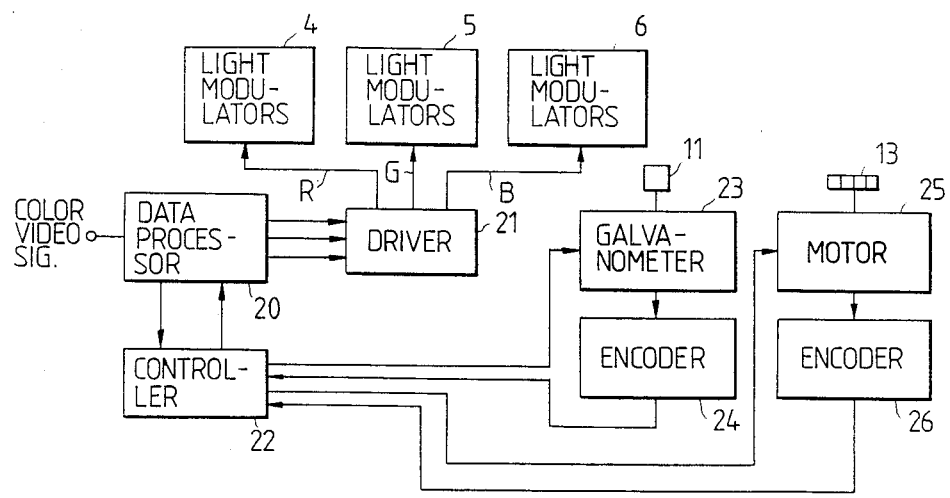
FIG. 8 is a block diagram showing the control system of the conventional color display apparatus.

In the control system shown in FIG. 2, parts corresponding to those of the control system shown in FIG. 8 are correspondingly referenced, and the description of those parts will be omitted.

A data processor 20a is arranged to demodulate the R, G and B signals in a supplied color video format signal by means of a color demodulation circuit (not shown). Each of the demodulated R, G and B signals is supplied to a serial-to-parallel conversion circuit in the data processor 20a.

Figure 4:
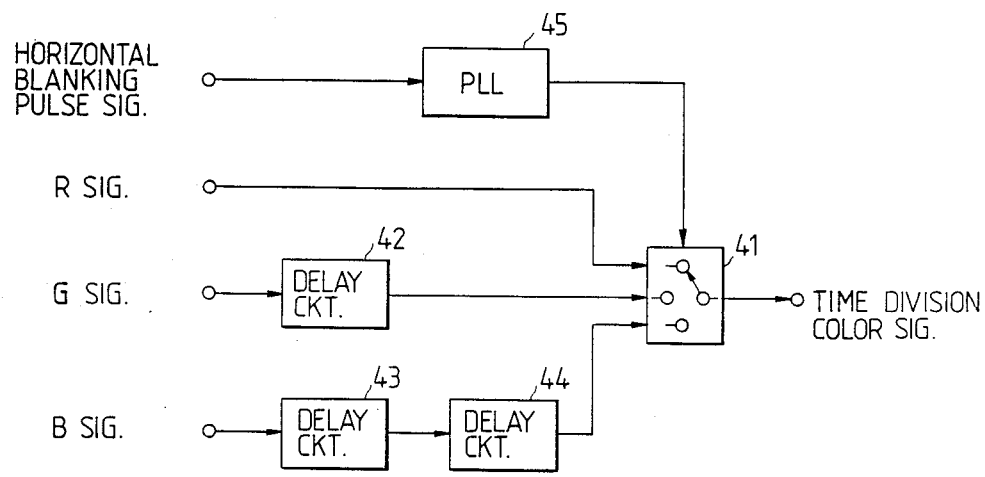
FIG. 4 is a block diagram showing an example of a serial-parallel conversion circuit in accordance with the present invention.
Figure 6:
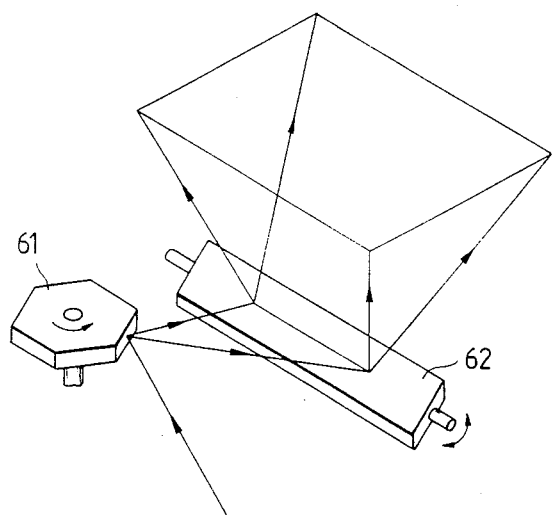
FIG. 6 is a schematic perspective view showing a second embodiment of a mechanical deflection system in accordance with the present invention.

FIG. 4 shows an example of such a serial-to-parallel conversion circuit. The R signal is applied to a first input terminal of the signal selection circuit 41. The G signal is applied to a second input terminal of the signal selection circuit 41 through a delay circuit 42. Delay circuit 42 is arranged to delay an input signal by the time required for the scanning light beam to scan one phosphor stripe on the screen. The B signal is applied to a third input terminal of the signal selection circuit 41 through delay circuits 43 and 44. Each of the delay circuits 43 and 44 is also arranged to delay an input signal by the time required for the scanning light beam to scan one phosphor stripe on the screen.

A switching control input terminal of the signal selection circuit 41 is supplied with a switching signal from a PLL circuit for generating switching signals. The switching signals are generated in synchronism with a video information section of a horizontal blanking pulse signal representing a horizontal flyback time and extracted from the color video format signal. The number of switching signals corresponds to the number of stripes on the screen 33. As a result, it is possible to obtain a time-division color signal corresponding to the positions of the three-primary-color phosphors of the screen 33, as shown in FIG. 5(B).

The serial-to-parallel conversion circuit may be constituted by a digital circuit. In that case, the R, G and B signals in an applied color video format signal are demodulated. Once stored in a RAM, the demodulated signals are then converted into a train of serial data in which color information is aligned in order of the R, G and B signals. The serial data train is applied to the driver 21a in synchronism with the read clock and has a frequency corresponding to the number of stripes on the picture plane in accordance with the supply command applied from a controller 22a.

The driver 21a supplies a light modulator 32 with a modulation signal, that is, a drive signal of a level corresponding to the level of the time-divisionally aligned R, G and B signals. Accordingly, the single light beam emitted from the laser generator 31 is intensity-modulated on a time-division basis with the R, G and B signals.

The controller 22a synchronizes the swinging of the reflection mirror 11 and the rotation of the rotary polyface mirror 13 with a vertical synchronizing signal and a horizontal synchronizing signal, respectively. For example, when the screen has a large picture plane, the controller 22a, may refer to the respective outputs of the start sensor 34 and the end sensor 35 to cause the light beam spot to accurately scan the R, G and B phosphors on the screen plane.

In the state where the scanning position of the light beam spot for scanning the R, G and B phosphors on the screen plane (as shown in FIG. 5(A)) and the R, G and B signals arranged in time-division from the data processor 20a (as shown in FIG. 4(B)) are synchronized with each other, and when only the R signal exists in a signal period corresponding to one picture element, the picture element on the screen is made red. In the case where all the R, G and B signals having the same signal level exist in a signal period corresponding to one picture element, the picture element on the screen is made white as shown in FIG. 5(C). The persistence of the phosphor screen is suitably established in accordance with the thickness and material of the coating layer of the screen.

Thus, a light beam emitted from a single light beam generator is time-divisionally intensity-modulated with R, G and B signals. Three-color luminous bodies on a screen plate are irradiated with the modulated light beam so that a color picture is displayed on the screen. In the case where phosphors are used as luminous bodies as described in the above embodiment, the generation of flicker that causes the picture plane to flicker can be suppressed because of the persistence property of the phosphors. Further, it is possible to use a mechanical deflection system which is inexpensive, and low in speed to thereby reduce the cost of the color display apparatus.

Figure 5:
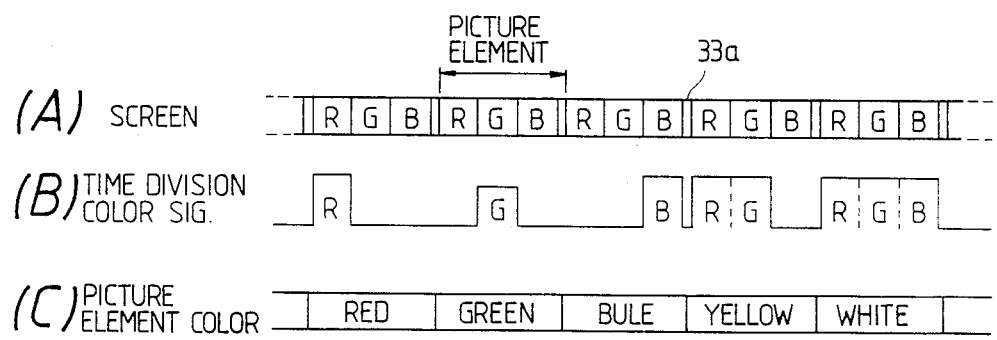
FIG. 5 is a timing diagram for explaining the operation of the apparatus of FIG. 1.

Although, in the embodiment as shown in FIG. 5, the pulse width of the time-division signal is equal to the width of each phosphor on the screen plane, it is preferable to make the pulse width narrower than the width of each phosphor in order to reduce color shift. Alternatively, the phosphors on the picture plane may be aligned regularly in the slant direction relative to the scanning direction. The mechanical deflection system is not limited to that shown in the drawings, but may be constituted by, for example, a rotary polyface mirror 61 for horizontal scanning and a large-sized rotary mirror (a rotary polyface mirror or a galvanometer) 61 for vertical scanning.

In the color display apparatus according to the present invention, as described above, since three-color luminous bodies are regularly aligned on the screen plane, and then those luminous bodies are scanned by a light beam time-divisionally intensity-modulated with R, G and B signals, only one light beam generator is used. Therefore, the color display apparatus can be constructed inexpensively.

What is claimed is:

1. A color display apparatus for displaying a color video format signal, comprising:
    a two-dimensional screen having a regular pattern of groups of light sensitive luminous elements arrayed in a predetermined direction, each of said groups of luminous elements including a red light sensitive luminous element, a blue light sensitive luminous element, and a green light sensitive luminous element;
    a light source for generating a single light beam carrying red, green and blue signals, said single light beam for projection onto said screen;
    means for generating horizontal and vertical synchronizing signals from the video format signal;
    light-beam deflection means for scanning said two-dimensional screen with said single light beam in synchronism with said horizontal and vertical synchronizing signals; and
    modulation means for receiving a drive signal corresponding to a position of the light beam on the screen, and for modulating the intensity of said single light beam in accordance with said drive signal to selectively cause different ones of said groups of luminous elements to luninesce.

2. A color display apparatus as set forth in claim 1, wherein said light beam deflection means comprises a first reflection mirror adapted to swing in synchronization with a vertical synchronizing signal of a video signal, a pair of relay lenses, a rotary polyface mirror, and a second reflection mirror, said first reflection mirror for reflecting a light beam through said pair of relay lenses to said rotary polyface mirror, said second reflection mirror for deflecting a light beam from said rotary polyface mirror to said screen.

3. A color display apparatus as set forth in claim 1, wherein each of said luminous elements is a phosphor.

4. A color display apparatus as set forth in claim 3, further including black shade member are interposed between adjacent luminous elements for preventing color bleeding.

5. A color display apparatus as set forth in claim 1, wherein said two-dimensional screen further includes a start sensor and an end sensor for horizontal synchronization control.

6. A color display apparatus as set forth in claim 5, wherein each of said start and end sensors includes a photoelectric conversion element.

7. A color display apparatus as set forth in claim 1, further comprising a data processor for demodulating a color video format signal, said data processor including a serial-to-parallel conversion circuit.

8. A color display apparatus as set forth in claim 7, wherein said serial-to-parallel conversion circuit includes a signal selection circuit and first and second delay circuits.

9. A color display apparatus as set forth in claim 8, wherein the signal selection circuit includes a switching control input terminal.

10. A color display apparatus as set forth in claim 1, further including a driver for supplying said modulation means with a drive signal.

11. A color display apparatus as set forth in claim 2, further including a controller for synchronizing the swinging of said first reflection mirror with the rotation of said polyface mirror.

12. A color display apparatus as set forth in claim 1, wherein said means for generating horizontal and vertical synchronizing signals comprises a data processor.

13. A color display apparatus as set forth in claim 12, wherein said light beam deflection means further includes a controller for receiving signals from said data processor, said controller including a microprocessor and PLL circuits for horizontal and vertical deflection.

14. A color display apparatus as set forth in claim 13, wherein said vertical deflector PLL circuit supplies a driving signal for swinging said first reflection mirror.

15. A color display apparatus as set forth in claim 12, wherein said horizontal deflection PLL circuit generates a driving signal for rotating said polyface mirror.

* * * * *